July 31, 1956   P. S. POFFENBARGER   2,756,754
CABINET WITH WARM AIR CIRCULATING MEANS
Filed July 21, 1954   2 Sheets-Sheet 1

INVENTOR
Perry S. Poffenbarger
BY
Mason, Fenwick & Lawrence
ATTORNEYS

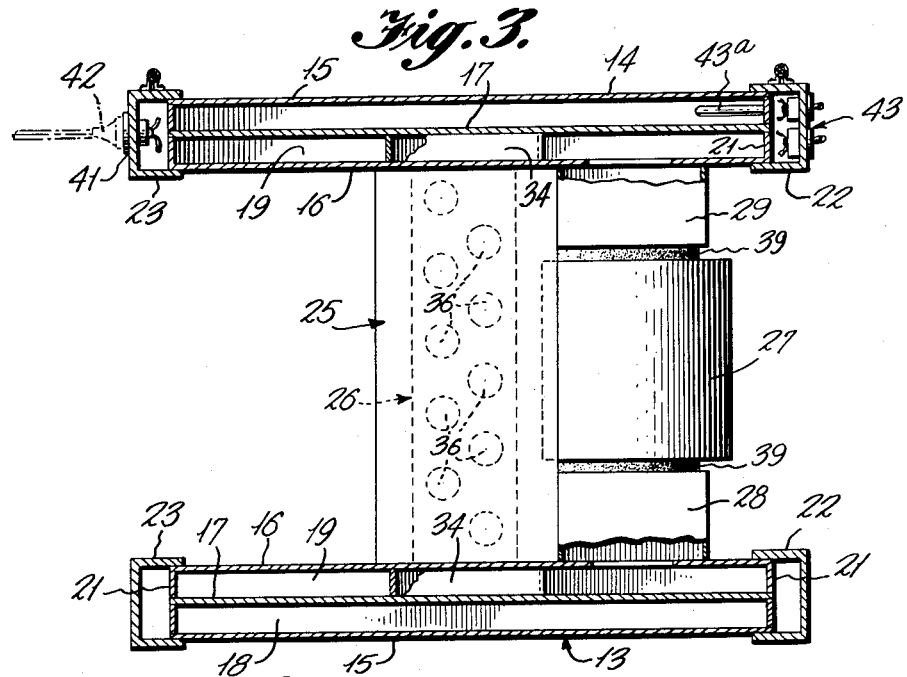
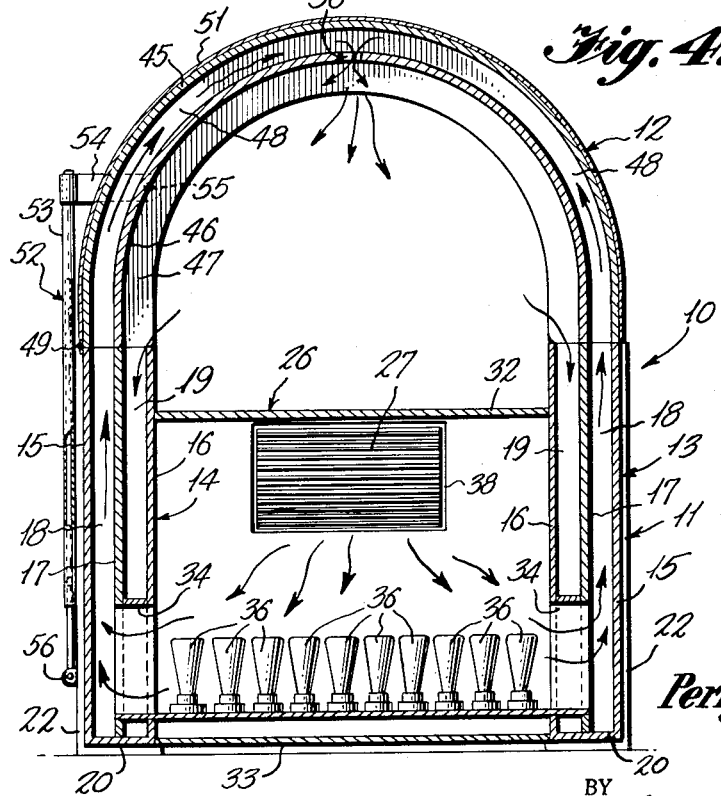

United States Patent Office 2,756,754
Patented July 31, 1956

2,756,754

CABINET WITH WARM AIR CIRCULATING MEANS

Perry S. Poffenbarger, Charleston, W. Va., assignor of one-third to Helen W. Poffenbarger, Charleston, W. Va.

Application July 21, 1954, Serial No. 444,829

5 Claims. (Cl. 128—373)

The present invention relates in general to heating apparatus, and more particularly to heating devices designed for therapeutic treatment of persons suffering from arthritis and other afflictions which are responsive to thermal treatment.

An object of the present invention is the provision of novel heating apparatus for therapeutic use characterized by simplicity of construction, maintenance and operation and which is arranged to facilitate home use of the apparatus without supervision by highly skilled technicians.

Another object of the present invention is the provision of a heating appliance for therapeutic use wherein heat treatment of bodies disposed within the apparatus is achieved by a novel principle and mode of operation to secure safe and effective thermal treatment.

Another object of the present invention is the provision of a novel therapeutic heating device for treatment of arthritis and the like wherein velocity heat transfer principles are applied to achieve safe effective operation in an economical and convenient form of structure.

Other objects, advantages and capabilities of the present invention will become apparent from the following detailed description, taken in conjunction with the accompanying drawings, showing a single preferred embodiment of the invention.

In the drawings:

Figure 3 is a horizontal section view taken along the lines 3—3 of Figure 2; and, Figure 4 is a vertical transverse section view, taken along the lines 4—4 of Figure 2.

Figure 1:
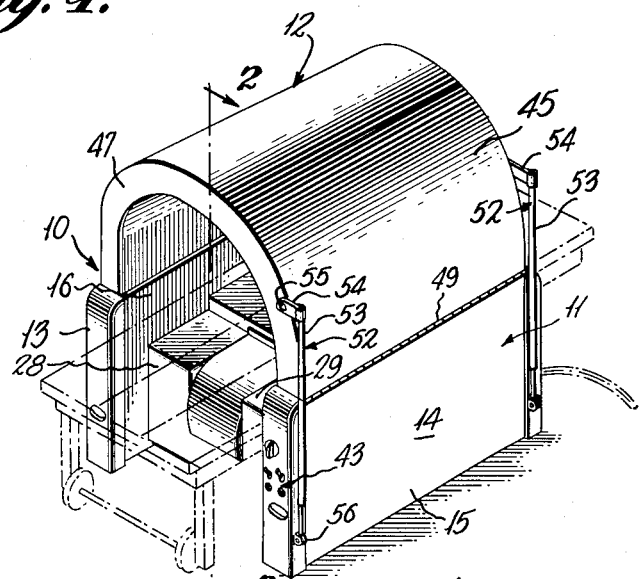
Figure 1 is a perspective of a therapeutic heating appliance embodying the present invention.
Figure 2:
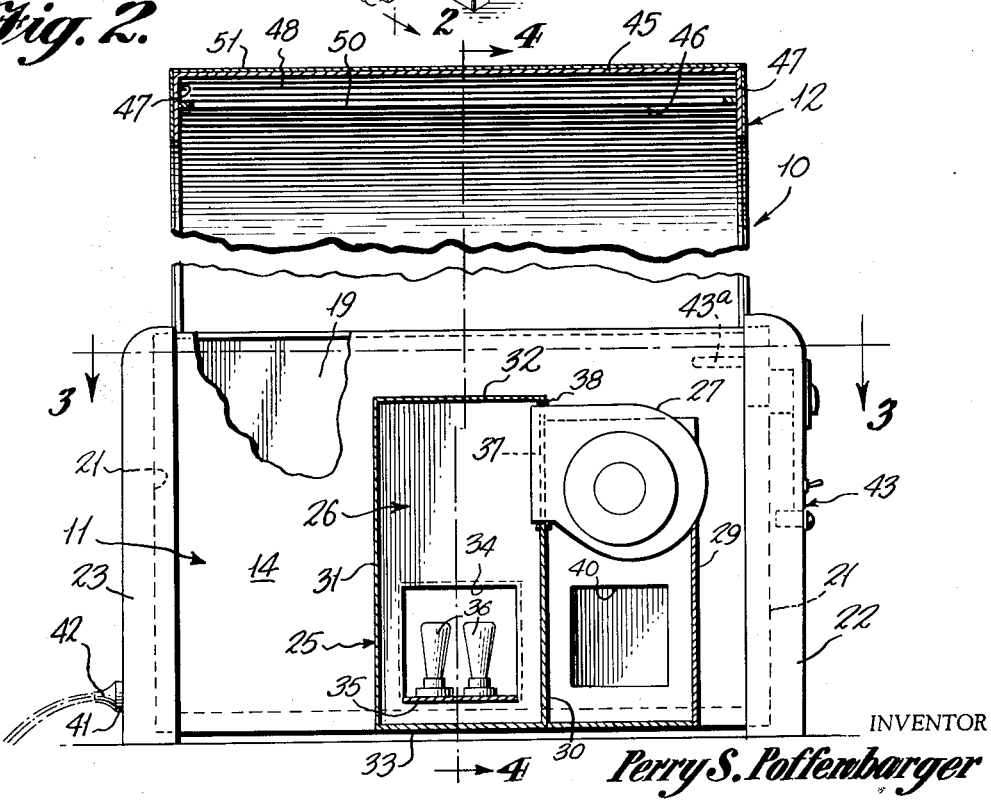
Figure 2 is a vertical longitudinal section view of the heating appliance, taken along the lines 2—2 of Figure 1.

Referring to the drawings wherein like reference characters designate corresponding parts throughout the several figures, the therapeutic heating appliance of the present invention, indicated generally by the reference character 10, comprises essentially two sub-units, a base unit 11, and a hood unit 12. The base unit 11 is formed of a pair of laterally spaced elongated pedestals 13 and 14. These pedestals 13 and 14 in the preferred embodiment measure twenty-four inches in height, thirty-six inches in length, and four inches in width and are designed to be disposed on end in erect parallel vertical planes. Each of these pedestals 13 and 14 are formed of sheet metal and have outer walls 15 and inner walls 16 and an intermediate partition panel 17 dividing the interior into two side-by-side chambers, an outer heated air chamber 18 and an inner air return chamber 19. A bottom wall 20 extends between the outer and inner walls 15 and 16, forming a bottom closure for both chambers 18 and 19, and end walls 21 enveloped by cast end blocks 22 and 23 fixed at the front and rear ends, respectively of the pedals to the outer and inner walls 15, 16 form closures for opposite ends of the pedestals. As shown in the drawings, these end blocks 22, 23 extend a slight distance below the bottoms of the pedestal walls 15, 16 to serve as supporting legs for the pedestals.

Extending perpendicularly between the pedestals 13 and 14 and supported by the pedestals is a heating assembly, generally indicated at 25, comprising a heater chamber 26, a blower 27 preferably of approximately 1000 cubic feet per minute capacity and a pair of blower intake boxes 28, 29. The heater chamber 26 is an elongated housing of rectangular cross-section formed of sheet metal having front and rear side walls 30, 31 and top and bottom walls 32, 33, respectively. The opposite ends of the sheet metal housing are secured by suitable means such as soldering, welding or the like to the inner walls 16 of the pedestals 13, 14.

Rectangular air exhaust ducts 34 extending from the outer chamber 18 of each pedestal 13, 14 through the intermediate partitions 17 and inner walls 16 communicate with each end of the heater chamber 26 adjacent the bottom wall 33. A sheet metal supporting panel 35 extends the length of the heater chamber 26 in parallel spaced relation with the bottom wall 33 and is fixed at each end to the inner pedestal walls 16 at the lower boundary of the exhaust ducts 34. Mounted on the supporting panel 35, in the preferred embodiment are ten 660 watt electric cone heaters 36 which are interconnected in series parallel circuit relation to consume a total power of 1,650 watts and thereby operate at a relatively low temperature level whereby the cone heaters will have a long life and will be less subject to corrosion from perspiration vapor produced during therapeutic use of the appliance.

An opening 37 is provided in the front wall 30 of the heater chamber 26 adjacent the top edge thereof. The opening 37 is slightly larger than the exhaust throat of the blower 27 to permit a mounting and sealing gasket 38 to be provided between the exhaust throat and the edge of the opening 37 to minimize transfer of vibration from the blower to the base unit 11.

The blower 27 is preferably of the type having the blower motor housed inside the blower shell and is provided with lateral air intake openings. Openings are provided in the end walls of the blower intake boxes 28, 29. The openings in the blower intake boxes that are adjacent the blower 27 are coupled to the blower lateral intake openings by annular sealing gaskets 39. The opposite ends of the blower intake boxes 28, 29 are bolted or otherwise fixed to the inner walls 16 of the pedestals 13, 14 and rectangular air return openings 40 are provided in the inner walls 16 to afford communication between the air return chambers 19 of the pedestals and the blower intake boxes 28, 29.

One of the rear end blocks 23 on one of the pedestals is preferably provided with an electrical socket 41 adapted to receive a conventional electrical supply line plug 42 and supply current to the cone heaters 36, and a plurality of switches, manual controls, pilot lights, and the like, indicated generally by the reference character 43, are provided on one of the front end blocks 22 to form a control panel for setting and controlling the heating mechanism. Preferably, a conventional timing clock mechanism and a thermostatic relay control unit, not shown, including a thermostat control bulb 43a are provided in the unit to automatically control the period of energization of the cone heaters 36 and the number and combination of heaters energized to maintain a preselected temperature in the unit. Since these specific mechanisms and their electrical circuits are well known in the art and form no part of the present invention, no further detail description of these components is deemed necessary.

Surmounting the base unit 11 and hinged for pivotal movement thereon about a horizontal axis at the upper edge of one of the pedestals, for example pedestal 14, is a hood unit 12. The hood unit 12 is a hollow semi-cylindrical body which is approximately two inches in thickness, and is preferably formed of an outer cylindrically curved wall 45 of stainless steel sheet material and an inner correspondingly curved wall 46 of galvanized iron together with semiannular sheet steel front and end walls 47 defining a chamber 48 therebetween. The lower edges of the outer and inner walls 45 and 46 are positioned to meet the upper edges of the outer wall 15 and intermediate partitions 17 of the pedestals 13, 14, and one lower edge portion of the outer hood wall 45 is coupled with the adjacent outer pedestal wall 15 throughout its length with a hinge 49.

The inner wall 46 of the hood unit 12 is provided with a longitudinal slot 50 approximately one and one-half inches wide at the peak of the hood extending the length of the hood and intercepting the medial vertical plane of the appliance. In the preferred embodiment, two thermometers are associated with the apparatus, one being disposed at each end of the longitudinal slot 50. One of these thermometers is a conventional recording thermometer designed to continuously record the temperature during operation of the apparatus and the other is an electrical or other conventional thermometer which may be easily read by the operator to keep a continuous visual check on the thermal conditions in the apparatus. The chamber 48 in the hood unit 12, the outer chambers 18 of the pedestals 13, 14 and the heater chamber 26 therefor constitute a plenum chamber tending to slightly compress the air delivered from the exhaust of the blower 27 and discharge the air out through the slot 50 at the top of the hood unit because the slot 50 is of insufficient size to freely discharge the air delivered by the blower 27 without slight compression.

A quilted cover 51 may be disposed over the outer surface of the hood unit 12 to serve as a thermal insulator and improve the efficiency of the appliance. A semi-insulating coating may be formed over the inside surfaces by coating the surfaces with shellac, cementing light weight building paper over these surfaces with the exception of the hood unit 12, and covering the paper coating with aluminum paint.

To limit the pivotal movement of the hood unit 12 and support the same at a predetermined open position, a plurality of supports 52 are interconnected between the hood unit 12 and the base unit 11. These supports 52 may take the form of a telescoping rod 53 having a mounting strap 54 secured to the upper end thereof and pivotally secured as indicated at 55 to the hood unit 12, the lower end of the telescoping rod 53 being pivotally coupled to a bracket 56 fixed on the side of one of the pedestals of the base unit 11. It will be understood that the upper hollow component of the telescoping rod 53 will have a limit stop therein to limit the maximum extent to which the lower rod portion may project into the hollow portion and that initial rotation of the hood unit 12 from closed to open position progressively increases the distance between the strap 54 and bracket 56 so that after a predetermined rotation of the hood unit the lower rod portion of the telescoping rod 53 again bears upon the stop within the hollow portion to limit further movement of the hood unit.

The therapeutic heating appliance is designed to operate on a principle of velocity heat transfer from the heated air supplied through the slot 50 in the hood unit 12 into the area enveloped by the hood unit. The blower 27 is designed to circulate air at a velocity of approximately 30 miles per hour over and around a patient positioned under the hood unit 12. This can be likened to the effect of an air flow over the hand of a person who projects his hand through the window of a vehicle moving at approximately 30 miles per hour, in which case, the hand within the usual temperature ranges feels cool even though the ambient temperature may be 90°. The temperature of the air within the area enveloped by the hood unit 12 is maintained by thermostatic control of the heater cones 36 at a temperature approximately 10° F. above normal body temperature, thereby producing velocity heat transfer to the patient. Where the temperature is 10° above normal body temperature, with the blower turned off and without the air in motion, the patient feels merely warm and muggy, but when the air is put in motion, he feels as if he is in a much higher temperature. This is due to the fact that there is a velocity heat transfer from the air to the patient, where in the example above there was a velocity heat transfer from the patient to the surrounding air.

It will be noted from the dimensions given in connection with the pedestals 13, 14 that the base unit extends to a height of approximately 24 inches to adapt the appliance to receive a portable table having the supporting surface disposed at approximately the altitude of the upper edges of the pedestals 13 and 14. The hood unit 12 extends a sufficient distance above the table surface to permit portions of the body of the patient reclining on the table to be received under the hood unit 12 without contacting the surfaces of the inner walls 46 thereof or the end walls 47. In use, the hood unit 12 is designed to be covered by an ordinary bed sheet forming a closure for the open ends of the hood unit.

Air which is expelled through the exhaust throat of the blower 27 located in the opening 37 in the side wall 30 of the heater chamber 26 is circulated over the series of heating cones 36 to be heated thereby, the number and combination of heating cones supplied with electrical current being determined by any suitable thermostatic control means. This heated air is expelled through the exhaust ducts 34 in the opposite ends of the heater chamber 26 and through the outer chambers 18 of the pedestals 13, 14 and the connecting chambers 48 and hood unit 12 and is expelled through the elongated slot 50 at the top of the hood unit. As previously described, the size of the slot 50 is designed to be insufficient to permit escape of air from the plenum chamber formed between chambers 18 and 48 without slight compression of the air within the plenum chamber. The heated air expelled through the elongated slot 50 then passes over the skin of the patient and is drawn through the open upper ends of the inner chambers 19 in the pedestals 13, 14 and thence through the openings 40 and blower intake boxes 28, 20 into the blower 27 to be recirculated through the exhaust throat of the blower.

Since the same air is recirculated again and again through the appliance, and the ends of the hood unit 12 are effectively sealed by a bed sheet, evaporation of perspiration evolved from the patient within the appliance is limited, since the heated air initially absorbs perspiration to its saturation point and thereafter can absorb no more moisture. The result of this is that the patient's skin remains wet, thereby improving the thermal conducting characteristics of the skin to improve the efficiency of heat transfer into the patient. This also prevents excessive drying out of the skin, to the extent that patients who have been placed in the appliance for as long as an hour and a half have, upon examination, been found to have suffered no undesirable drying of the skin.

Since the above-described appliance may be operated effectively at temperatures not in excess of 108° F. and yield the desired therapeutic effects, there is no danger of burning the patient through physical contact with the interior metallic surfaces of the appliance and due to the operation of the machine on the heated air circulation principle, the use of heat lamps which might produce serious ultraviolet ray burns is avoided. Clinical experimentation may show that temperatures somewhat in excess of 108° may be desirable. In other words, for short periods of time, they might want to go as high as 120°. The machine may be conveniently used in the home since it operates off of conventional electrical supply sources available in the home and is sufficiently simple in construction and operation that it can be effectively controlled by persons not having high technical skills in the therapeutic treatment arts.

While but one particular embodiment of the invention has been particularly shown and described, it is apparent that various modifications may be made in the invention without departing from the spirit and scope thereof, and it is desired, therefore, that only such limitations shall be placed thereon as are imposed by the prior art and are set forth in the appended claims.

I claim:

1. A therapeutic heating appliance comprising a base unit adapted to be disposed below a table surface, said base unit having upwardly opening circulation chambers adjacent opposite sides thereof, a heating chamber having means for heating air therein, blower means coupled to said heating chamber for circulating air therethrough at a preselected velocity, duct means intercoupling said heating chamber and said circulation chambers for delivering air from said heating chamber to said circulation chambers, a hood member movably supported over said base unit in position to extend over the table surface, said hood member having circulation chambers therein communicating with said first mentioned circulation chambers and an air exhaust slot in said hood member communicating with said hood circulation chambers for expelling air therefrom inwardly of said hood member, and air conduit means in said base unit opening inwardly of said hood member and communicating with said blower means for returning air from said hood member to said blower means.

2. A therapeutic heating appliance adapted for use with a portable table for supporting a patient to be treated, comprising a base unit adapted to be disposed below the table surface, said base unit comprising a pair of laterally spaced elongated upstanding pedestal members each having a pair of upwardly opening air circulation chambers therein, a transverse heating chamber extending between and supported by said pedestal members, said heating chamber having electrically energized heating means therein, blower means coupled to said heating chamber for circulating air therethrough at a preselected velocity, duct means extending between said heating chamber and selected ones of said air circulation chambers, a hood member movably supported on said base unit to extend over the table surface, said hood member having circulation chambers therein communicating with the air circulation chambers of said base unit coupled through said duct means with said heating chamber, said hood member circulation chambers having outlet slot means for delivering air from said hood member chambers inwardly of said hood member, duct means interconnecting the others of said air circulation chambers in said pedestal members with said blower means, and said other air circulation chambers in said pedestal members opening inwardly of said hood member to form air return conduit means for returning air to said blower means.

3. A therapeutic heating appliance adapted for use with a portable table for supporting a patient to be treated, comprising a base unit adapted to be disposed below the table surface, said base unit comprising a pair of laterally spaced elongated upstanding pedestal members each having a pair of upwardly opening air circulation chambers therein, a transverse heating chamber extending between and supported by said pedestal members, said heating chamber having electrically energized heating means therein, a blower supported on said heating chamber for producing forced circulation of air through said heating chamber at a preselected velocity, duct means at opposite ends of said heating chamber communicating the same with one of the air circulation chambers in each of said pedestal members, air return duct means extending between each of said pedestals and said blower for communicating the other air circulation chamber of each of said pedestals with said blower, a hood member pivotally supported on one of said pedestal members and extending over the table surface in enveloping relation therewith, said hood member having circulation chambers therein communicating with the air circulation chambers of each of said pedestals coupled with said heating chamber, said hood member circulation chambers terminating at the top of said hood member in a common air exhaust slot for expelling air therefrom inwardly of said hood member, the other air circulation chambers in said pedestals opening inwardly of said hood member to form air return conduit means for returning air through said return ducts to said blower.

4. A therapeutic heating appliance adapted for use with a portable table for supporting a patient to be treated, comprising a base unit adapted to be disposed below the table surface, said base unit comprising a pair of laterally spaced elongated upstanding pedestal members each having a pair of upwardly opening air circulation chambers therein, a transverse heating chamber extending between and supported by said pedestal members, said heating chamber having electrically energized heating means therein, a blower supported on said heating chamber for producing forced circulation of air through said heating chamber at a preselected velocity, duct means at opposite ends of said heating chamber communicating the same with one of the air circulation chambers in each of said pedestal members, air return duct means extending between each of said pedestals and said blower for communicating the other air circulation chamber of each of said pedestals with said blower, an upwardly arching hood member pivotally supported on one of said pedestal members and extending over the table surface in enveloping relation therewith, said hood member having circulation chambers therein communicating with the air circulation chambers of each of said pedestals coupled with said heating chamber, said hood member circulation chambers terminating at the top of said hood member in a common air exhaust slot for expelling air therefrom inwardly of said hood member, said slot being of sufficiently small size to produce slight back pressure within said hood member circulation chambers, said hood circulation chambers and the pedestal chambers communicating therewith constituting a pair of plenum chambers extending oppositely from said slot.

5. A therapeutic heating appliance adapted for use with a portable table for supporting a patient to be treated, comprising a base unit adapted to be positioned below the table surface, said base unit including a pair of elongated rectangular upstanding hollow pedestals having parallel outer and inner walls and an intermediate parallel partition dividing the interior of said pedestals into a pair of parallel coextensive air circulation chambers opening upwardly of the pedestals, a heating chamber formed of an elongated housing shell fixed at its opposite ends to the inner side wall of said pedestals to be suspended therebetween, a plurality of electrically energized heater cones interconnected in series parallel relation arranged lengthwise within said heating chamber, a blower supported on a wall of said heating chamber housing intermediate the ends thereof having an exhaust throat projecting into said heating chamber for circulating air therethrough at a preselected velocity, duct means extending through the inner wall of each of said pedestals and uninterruptedly through the innermost air circulation chambers for communicating said heating chamber with the outermost air circulation chambers in said pedestals, air intake boxes extending between the inner walls of each of said pedestals and the adjacent sides of said blower forming an air return duct between the innermost air circulation chambers of said pedestals and said blower, an upwardly arching semicyclindrical hood pivotally supported at one edge thereof to one of said pedestal members and positioned to extend over the table surface in enveloping relation with a patient supported on said table, said hood having a circulation chamber extending entirely along its cylindrical periphery and communicating at each end thereof with the upwardly opening ends of the outermost circulation chambers of said pedestals, said hood circulation chamber having an air exhaust slot in the uppermost portion thereof extending the length of said hood and opening inwardly of said hood for expelling air from said hood circulation chamber inwardly of said hood, said hood circulation chamber and said outermost pedestal circulation chambers constituting a pair of plenum chambers extending oppositely from said slot and said slot being of a size to produce back pressure within said plenum chambers and effect slight compression of the air therein, said innermost air circulation chambers of said pedestals opening into said hood member to form air return conduits for returning air from said hood member through said blower intake boxes to said blower.

References Cited in the file of this patent

UNITED STATES PATENTS

| | | |
|---|---|---|
| 735,851 | Abell | Aug. 11, 1903 |
| 2,098,295 | Kettering et al. | Nov. 9, 1937 |
| 2,098,316 | Sittler | Nov. 9, 1937 |
| 2,662,521 | Armstrong | Dec. 15, 1953 |